(12) United States Patent
Bodor et al.

(10) Patent No.: US 6,468,578 B1
(45) Date of Patent: Oct. 22, 2002

(54) PROCESS FOR PREPARING A SPREAD

(75) Inventors: Janos Bodor; Michael Erdl, both of Vlaardingen (NL); Klaus Mayer; Karel Vermaat, both of Kleve (DE)

(73) Assignee: Lipton, division of Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 09/647,342

(22) PCT Filed: Mar. 25, 1999

(86) PCT No.: PCT/EP99/02181
§ 371 (c)(1),
(2), (4) Date: Nov. 20, 2000

(87) PCT Pub. No.: WO99/49738
PCT Pub. Date: Oct. 7, 1999

(30) Foreign Application Priority Data

Apr. 1, 1998 (EP) ............................................ 98201033

(51) Int. Cl.[7] .................................................. A23D 7/00
(52) U.S. Cl. ..................................... 426/603; 426/602
(58) Field of Search ................................. 426/581, 530, 426/603, 604, 585, 602

(56) References Cited

U.S. PATENT DOCUMENTS

| | | | | |
|---|---|---|---|---|
| 4,307,125 A | * | 12/1981 | Amer | 426/604 |
| 4,438,149 A | * | 3/1984 | Verhagen | 426/603 |
| 4,540,593 A | * | 9/1985 | Moran | 426/603 |
| 4,555,411 A | * | 11/1985 | Moran | 426/603 |
| 4,840,810 A | * | 6/1989 | Bodor | 426/312 |
| 4,844,928 A | * | 7/1989 | van Heteren | 426/312 |
| 4,959,239 A | * | 9/1990 | Ernsting | 426/603 |
| 5,013,573 A | * | 5/1991 | Bodor | 426/602 |
| 5,064,677 A | * | 11/1991 | Cain | 426/611 |
| 5,075,125 A | * | 12/1991 | Mongeau | 426/581 |
| 5,554,407 A | * | 9/1996 | Bodor | 426/603 |
| 5,837,307 A | * | 11/1998 | Bodor | 426/603 |
| 5,895,685 A | * | 4/1999 | Bodor | 426/582 |

FOREIGN PATENT DOCUMENTS

| | | | |
|---|---|---|---|
| EP | 0 096 631 | | 12/1983 |
| EP | 0185631 | * | 5/1986 |
| EP | 0185000 | * | 6/1986 |
| EP | 0 199 398 | | 10/1986 |
| EP | 0 293 980 | | 12/1988 |
| EP | 0 347 006 | | 12/1989 |
| EP | 0 347 008 | | 12/1989 |
| EP | 0385541 | * | 9/1990 |
| EP | 0393739 | * | 10/1990 |
| EP | 0505007 | * | 9/1992 |
| EP | 0545489 | * | 6/1993 |
| GB | 2130233 | * | 5/1984 |
| WO | WO 97/04660 | * | 2/1997 |
| WO | WO 97/08956 | * | 3/1997 |

OTHER PUBLICATIONS

Charters 1995 Physicochemical Aspects of the Microbiology of edible table spreads. J of the Society of Dairy Technology 48(3) 87–96.*

Winton 1937 The Structure and Composition of Foods, vol. III John Wiley & Sons, New York p 33, 152–162.*

Webb 1965 Fundamentals of Dairy Chemistry The AVI Publishing Co., Inc Westport CT p 492–500.*

* cited by examiner

Primary Examiner—Carolyn Paden
(74) Attorney, Agent, or Firm—Milton L. Honig

(57) ABSTRACT

Butterlike spread not containing a substantial amount of butter fat which is prepared starting from a concentrated vegetable fat cream. The surface average, size ($D_{3,2}$) of the fat droplets of the cream being 3–7 $\mu$m ensures stability of the supercooled cream, so that it enters with a substantially liquid fat phase the inversion unit, whereafter the major part of the fat crystallizes after the emulsion has left the inversion unit and preferably under quiescent conditions. The cream is processed in a spread production line which comprises a device for making a O/W-emulsion with the necessary small fat droplets, a pasteurizer, a tubular heat exchanger and, as sole working, a cavity transfer mixer, which brings about the inversion.

13 Claims, 2 Drawing Sheets

PROCESS FOR PREPARING A SPREAD

BACKGROUND OF THE INVENTION

1. Field of the Invention

The present invention concerns a process for the preparation of a spread product. The spread obtained with the invented process is particularly suitable for use on bread and shows a surprisingly high butterlikeness, although for its preparation no dairy fat is needed.

2. The Related Art

With regard to consistency, taste and mouthfeel butter is for many consumers still the benchmark product for assessing spreads of premium quality. Many attempts have been made to develop a spread which contains no or only little butterfat but which is similar to real butter with regard to taste and mouthfeel. See e.g. East German patent 225327, U.S. Pat. No. 4,20,9546, EP 96631 and EP 199398. The processes of the prior art either do not yield a product which is really satisfactory or the processes are complicated, expensive or require a substantial amount of butter fat (melanges).

It is known that a process for the preparation of a spread which resembles butter with respect to consistency and mouthfeel preferably should include quiescent conditions for crystallisation of the structuring fat in the fat phase. The crystallisation process should not be disturbed by any kind of working. Under such circumstances the fat crystals network obtains its highest stability which results in a maximum structured fat phase. Such post-inversion quiescent crystallisation requires, however, process conditions which seem to be contradictory.

At inversion the water continuous emulsion, containing at least 50 wt. % of fat, has to be cool, with a temperature below the melting temperature of the structuring fat. When manufacturing on an industrial scale, cooling an emulsion in a quick pace needs stirring, which inevitably causes considerable shear and working. After inversion this working is undesired and before inversion the shear contributes to crystallisation of the dispersed fat droplets, consequently resulting in a cooled and ripened cream with an undesirably high viscosity. The more or less crystallized fat globules are desired because they enhance the eventual butterlikeness perception, but their structure will be adversely affected by the high shear forces occurring in the inversion unit. Moreover, in order to have coalesced the liquid part of the dispersed fat droplets, shear forces of the invertor are used. The needed energy, however, is proportionate to the viscosity of the ripened cream, which viscosity increases when fat crystallisation proceeds. A small amount of crystallized fat is desired, however, for stabilizing the dispersed aqueous phase droplets which result from the inversion process.

The spread manufacturing process described in EP 293980 is characterised by the initial preparation of a crude emulsion. A pasteurised cream is cooled in a static heat exchanger, particularly in a tubular heat exchanger where working effects on the emulsion are largely absent. The average size of the fat droplets is at least 10 $\mu$m and preferably more. Its water-continuous condition is maintained until the cream enters a working unit where the cream is inverted to a fat continuous spread. The risk of premature inversion is averted by increasing the viscosity of the water phase. This viscosity is increased by incorporating a gelling or thickening agent and, optionally, by lowering the temperature. When lowering the temperature the fat phase already starts to crystallise.

A cream with a viscous water phase requires an inversion unit with a high energy output. But, as said before, it is not desired to expose the emulsion to such high energy. The obtained spread may exhibit good quality, but no butterlikeness has been reported.

The process described in EP 199398, aims at the preparation of a spread which is fat continuous and which has butterlike properties. The initial water continuous emulsion, the cream, is conducted through an inversion unit. Premature inversion is prevented applying either of two options: keeping the cream until inversion at a safe ambient temperature, where cooling is applied only during the subsequent inversion step or allowing the cream to ripen at a low temperature so that stabilizing fat crystals have been formed before the cream enters the inversion unit. For inversion a so-called cavity transfer mixer (CTM) is used. The first option requires, however, a considerable cooling capacity of the inversion unit. When only using small volumes as described in the patent examples a process using a cavity transfer mixer may be feasible. But, since such CTM has a much limited cooling capacity and can not cope with the heat removal of large volumes, the described process will fail when it has to be carried out on an industrial scale. The second option which comprises inversion of a cooled and ripened emulsion is not suitable either, because the amount of solid fat formed before inversion is undesirably high.

None of the prior art processes is able to realize a quick inversion of a cream consisting of substantially liquid fat and resulting into a spread with a highly structured fat phase.

SUMMARY OF THE INVENTION

For the preparation of an edible butterlike spread consisting of an edible W/O emulsion which contains 50–85 wt. % of triglyceride fat, comprising the steps of a. preparing a cream, 15–50 wt. % of which consists of an aqueous phase in which 50–85 wt. % of liquefied fat is dispersed as fine droplets, b. pasteurizing the cream, c. cooling the cream and then conducting it through an inversion unit where inversion to a fat continuous emulsion takes place, d. allowing the inverted fat-continuous emulsion to crystallize to a spread, characterized in that the cream is subjected to such cooling regime that the dispersed fat, when the cream enters the inversion unit, is in a substantially liquid, supercooled condition, which condition is so unstable, that inversion of the cream is completed within 30 seconds after it has entered the inversion unit.

The present invention provides a simple, cheap and reliable process which delivers a spread which shows a surprisingly high butterlikeness and which process can dispense with the use of butter fat as an ingredient of the fat phase.

The second cooling unit G is connected with a cavity transfer mixer which is employed as an inversion unit. A remelting unit is incorporated parallel to the packaging machine in order to ensure recirculation of ready spread material as soon as it can not be properly processed by the packaging machine.

Figure 1:
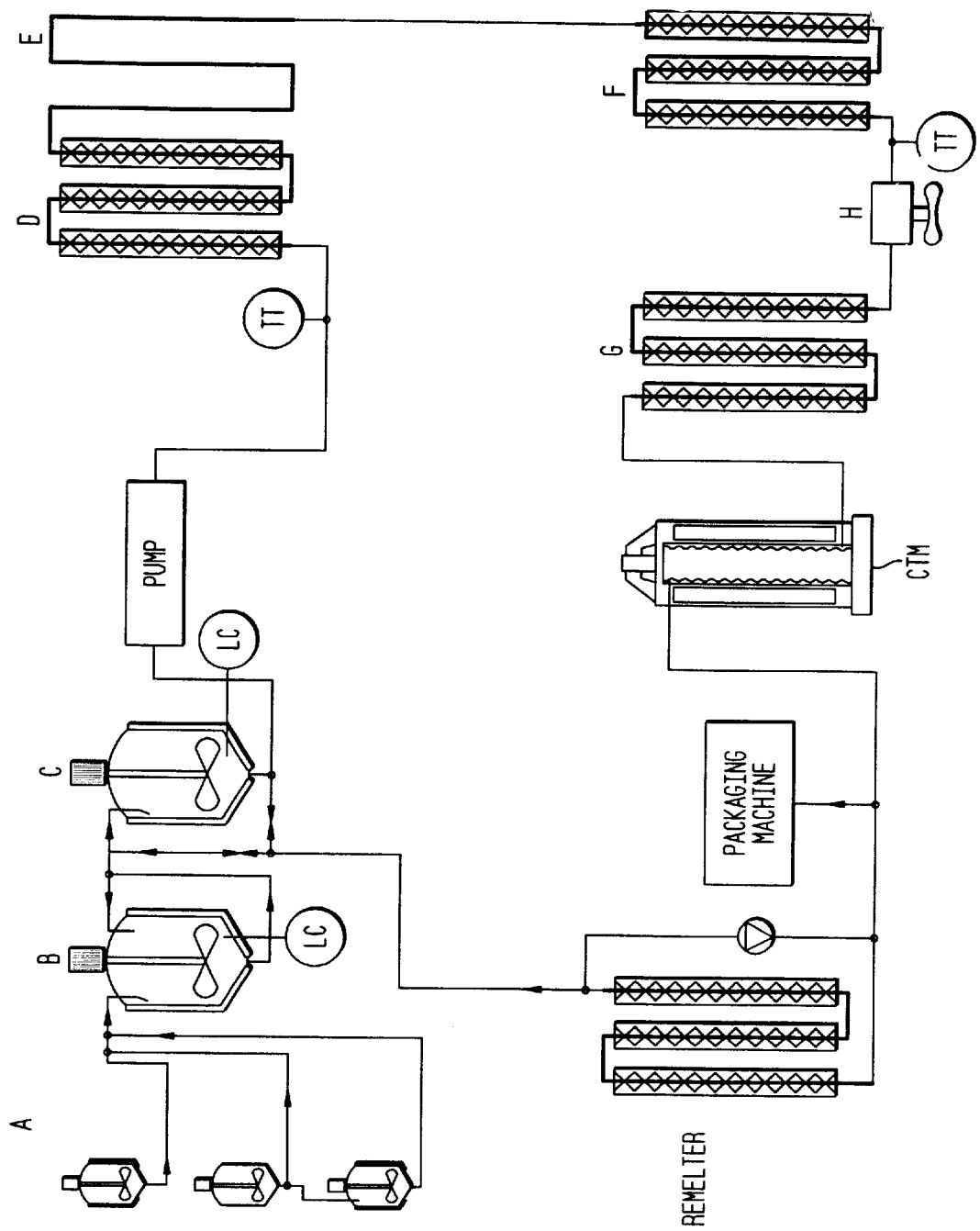
FIG. 1 shows a flow scheme illustrating one embodiment of the process according to the invention. The tanks A contain the ingredients for the fat phase and the water phase. B is a premix tank provided with a high speed stirrer where the cream is prepared. Via a run tank C the cream is pumped through a pasteurizer D and further via a holding pipe E to two consecutive cooling units F and G. The cooling units in the figure merely consist of tubes or interconnected tube-like containers preferably cooled by water. According to the shown embodiment a homogenizer H is included in the line between both cooling units.
Figure 2:
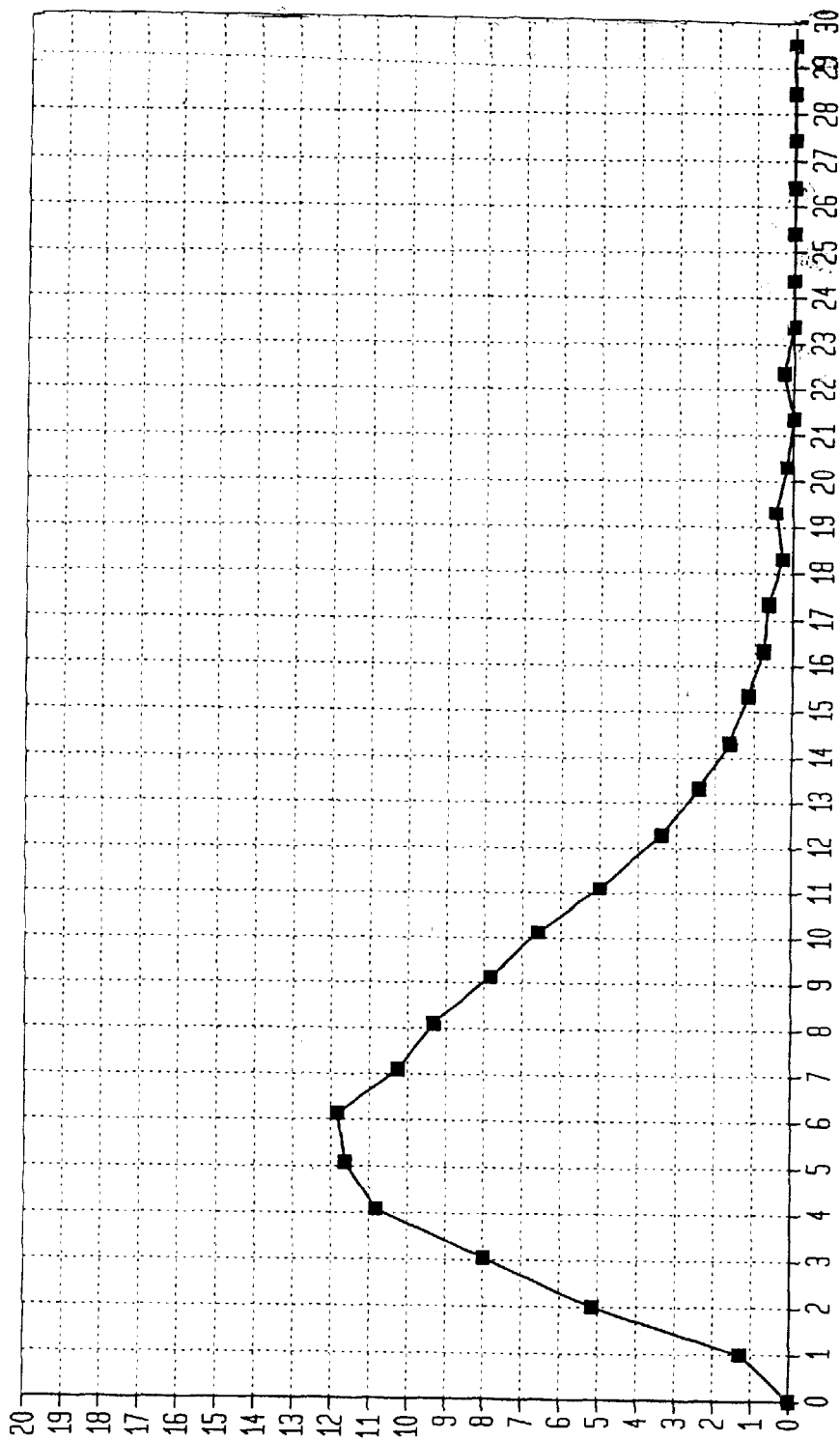

FIG. 2 shows the oil droplet size distribution of a non-dairy cream containing 65% of fat which is typical for use in the invention. On the vertical axis: Number of fat globules (%), on the horizontal axis Oil droplet size in micrometer (average size is 5.3 micrometer).

DESCRIPTION OF THE INVENTION

The initial cream, a water continuous emulsion, is prepared by vigorous mixing of the aqueous phase and the fat phase at a temperature, particularly at least 40° C., at which the fat phase has been fully liquefied. Since the amount of fat, at least 50 wt. % which is finely dispersed in the aqueous phase, is relatively high, a powerful and effective mixer is necessary. Preferably, the emulsion consists of 55–70 wt. % of a fat phase and 30–45 wt. % of an aqueous phase. Optionally, the usual fat phase ingredients such as flavours, colouring agents and emulsifiers may now be admixed to the fat phase. Equally the aqueous phase may contain common aqueous phase ingredients such as stabilizing proteins (e.g. buttermilk powder), cooking salt, preservatives, acidulants and flavours.

Crystallisation of fat normally is a relatively slow process. In the step following the pasteurisation the emulsion is subjected to a cooling regime in which the rate of cooling and the eventually attained temperature is such, that the fat will turn into a supercooled state i.e. the solid fat content is less than the equilibrium solid fat content at that temperature. Instead of getting crystallised it remains substantially liquid. Typical for a supercooled condition is retardation of crystallisation which prevents an increase of viscosity. However, a small amount of fat crystals in the supercooled fat, anyway less than 6 wt. % of the fat phase, is allowed and even desired for stabilisation of the aqueous phase droplets which are formed during the subsequent inversion step. Such a small amount of solid phase has only little effect on the cream viscosity.

The temperature of the cooled cream is chosen so low, that the instable supercooled cream gets inverted within 30 seconds after it has entered the inversion unit, which inversion is accompagnied with the immediate onset of fat crystallisation.

The substantially liquid status of the fat phase when entering the inversion unit is crucial for having the aqueous phase quickly and finely dispersed into the fat phase which becomes continuous during inversion. Then, aqueous phase droplets with an average ($D_{3.3}$) size of 2–4 μm can be formed easily. Such fine dispersion helps to prevent phase separation and bacteriological contamination of the final emulsion.

Too deep cooling of the cream increases the risk of pre-inversion. Pre-inversion is noticed by the skilled man when clustered fat occurs which is a visible signal. When the cream, however, is not cooled deep enough, it lacks the instability necessary for being inverted within 30 seconds. Then the emulsion leaving the inversion unit is not or only partially inverted, which is apparent from an insufficient decrease of the electrical conductivity. Rate and temperature of the cooling regime is dictated by circumstances, particularly by the nature of the cream fat. The skilled man can easily try out best cooling conditions and monitor and control the process such that both pre-inversion is prevented and that the cream, with substantially liquid fat when entering the inversion unit, fully inverts within the maximum 30 seconds that the cream emulsion stays in the inversion unit. The process is suitably controlled by manipulating the temperature of the cream.

It has been found that for controlling the supercooled status the volume average size ($D_{3.2}$) of the fat droplets plays an important role and preferably is not more than 7 μm. On the other hand a quick coalescence of the fat droplets of the initial emulsion and their subsequent crystallisation during inversion is furthered when their surface averaged size ($D_{3.2}$) is at least 3 μm. Said requirements suggest a preferred range of 3–7 μm for the surface averaged size ($D_{3.2}$) of the fat droplets in the initial cream emulsion. Consequently, stirring of the cream should be conducted long enough and with so much shear that that preferred fat droplet size is attained. If necessary a homogenizer is used. The present specification of averaged particle size diameters is according to definitions found in Alderliesten, M., Mean Particle Diameters, Part. Part. Syst. Charact. 8 (1991) 237–241.

The supercooled, unstable cream should be cooled and conducted to the inversion unit at such a quick rate that all the fat globules enter the inversion unit in a substantially liquid condition. Fat globules are apt to get clustered which makes the cream prone to undesired pre-inversion. These clusters become disrupted by applying to the cream during the cooling step a mild, moderate shear treatment, e.g. by using a homogenizer or a pressure valve. The treatment should deliver just enough shear to decluster. Any excess of shear enhances the risk of premature inversion. A 10 bar pressure drop will suit already.

For stabilizing its water continuity and preventing premature inversion the cream preferably contains a proper amount of protein, preferably dairy protein. Dairy protein is added preferably in the form of fresh buttermilk or reconstituted buttermilk and in such small amount that inversion is not prevented. A suitable amount is 0.02–10 wt. %, preferably 0.05–5 wt. %; of dairy protein on aqueous phase.

For supporting subsequent inversion and for stabilizing the final fat continuous emulsion, functional amounts of W/O-emulsifiers, monoglyceride, e.g. 0.2 wt. %, and lecithin, e.g. 0.2 wt. %, may be admixed to the cream.

The risk of premature phase inversion can be reduced further by avoiding undue shear during cooling of the cream. Use of a static heat exchanger such as a common tubular heat exchanger not only reduces shear, but also, on account of its simple construction, contributes to the economy and the reliability of the process. Tap water and ice water suffice for cooling, in contrast to the expensive and risky liquid ammoniak cooling as applied in traditional Votator™ A-units.

It is known that the fat droplets within cream which survive coalescence during inversion enhance butterlikeness perception. They are much alike the microscopic particle-like fatty entities which can be observed in churned butter. The fat droplets, being enveloped in a protein membrane, solidify and remain as entities within but separate from the fat phase which becomes continuous. They get embedded as separate solid particles in the crystallised fat phase. However, additional shear after inversion may damage those isolated fat structures. Therefore it is recommended that the major part, preferably at least 70 wt. %, of the solid fat of the spread is allowed to crystallise after inversion and under quiescent conditions. Conditions are quiescent when after inversion the crystallising fat is not disturbed e.g. by working. Without working the solid fat matrix is formed by fat crystals in their most stable modification. A beneficial consequence is that the structuring properties of such fat phase are enhanced and no post hardening is observed. Said isolated, solidified fat droplets can be observed by microscope in the crystal structure of the fat phase.

Alternatively, if maximum hardness has to be avoided, gentle working of the spread after inversion is applied to the extent required for obtaining the desired softer consistency.

Fat crystallisation rate may appear to be the rate limiting factor of the present process. Therefore conditions are chosen such that the fat phase crystallises quickly after inversion. A fat is said to crystallise quickly if, when being liquid and cooled to the temperature of the post-inversion part of the line (5°–15° C.), the solids content will accrue with at least 8 wt. % within 10 minutes, until 100 wt. % will be solidified. The rate is measured when fat crystallization has proceeded about half-way. Preferably a fat is chosen with a proper crystallisation rate, else a crystallisation accelerating agent may be added. The presence in the cream of small amounts of crystallised fat, but anyway less than 6 wt. % on total fat, is also helpful to promote crystallisation.

Fats which show a suitable crystallization behaviour are, for example, coconut oil, palm oil, sunflower oil, rapeseed oil, soybean oil and palm kernel oil. Also their fractions, blends and interesterified mixtures thereof are permitted, provided the said conditions for quick crystallisation are fulfilled.

In its appearance and results the present process is much alike traditional churning, but with the advantage over churning that on account of the high concentrations of fat phase in the cream the formation and separation of butter milk after inversion can be avoided. Further the long and inefficient ripening times of 10 hours and more are eliminated and aeration can be dispensed with too, which otherwise could be a source of microbiological contamination.

The liquid, low viscosity condition of the cream's fat phase, allows a quick inversion being, from entering the inversion unit, only 30 seconds or less, preferably 1–5 seconds. A quick inversion is necessary, because the residence time in the inversion unit must be short. When the inverting cream stays longer than 30 seconds in the inversion unit, considerable fat crystallisation under working conditions can not be avoided which is at the expense of the subsequent quiescent fat crystallisation. The shear energy needed for inversion therefore should be imparted to the cream during the 30 seconds or less that the cream emulsion stays in the inversion unit.

For meeting the said requirements of the present process a cavity transfer mixer happens to be a particularly suitable device. Although known mainly as a mixing unit, it can operate perfectly as an inversion unit for the present invention. Alternatively, also a colloid mill, an A-unit or an in-line Turrax mixer can suitably be used, provided these are adjusted such that they are able to supply to the emulsion the required inversion energy within said short cream residence time. For obtaining a high degree of butterlikeness the inversion should be so mild that a substantial part of the protein enveloped fat droplets from the cream is conserved.

The cavity transfer mixer is a common mixing device. It is described in more detail in EP 199397 dealing with spread preparation as a tool for mixing two separate feed streams.

Its use as an inversion unit has been mentioned already in EP 199398 discussed above. Said mixer is essentially characterized by two closely spaced, mutually displaceable surfaces, each having a pattern of cavities which overlap during movement of one surface with respect to the other. The material moving between the surfaces traces a path through cavities alternately in each surface. The cavity transfer mixer provides a unique combination of a specific high input of shear energy, a short residence time and a flow path through the device which allows the survival of the above-mentioned solid fat structures. Phase inversion is quickly realised, so that the immediately starting crystallisation of the supercooled fat phase can proceed quietly outside the inversion unit. Its use as the sole inversion equipment in a large scale spread manufacturing line forms an essential difference with its cooling operation as employed in a related, but small scale spread manufacturing process of the discussed prior art.

When measuring hardness a Stevens value of at least 300 g is easily attainable. Such high Stevens values are attractive because they are typical for butterlikeness perception. Quiescent crystallisation of the fat phase results into maximum hardness of the final spread. This becomes particularly apparent when the spread is exposed to common (temperature) cycling conditions in the form of frequent moves of the spread tub from the low temperature of the home refrigerator to the ambient temperature of the breakfast table and back again to the refrigerator. Then most of the common spreads show a kind of undesirable post-hardening caused by the gradual recrystallisation of the instable fat phase into a more stable crystal matrix. The present spread, to the contrary, will soften when exposed to cycling. A spread as obtained by the invented process therefore is characterized by a hardness as expressed in Stevens-values which decreases when the spread is exposed to cycling conditions.

Butterlikeness is a spread quality which is easily recognised and highly appreciated, but which is also difficult to capture in exact parameters. For the present spreads butterlikeness has been assessed during tasting sessions by a sensory panel when comparing spreads having an identical composition but obtained by a different processing. The similarity with butter consistency becomes apparent too in the plasticity and elasticity of the spread. The plasticity of the product has been judged by inserting a rod into the product and observing the degree of collar formation and when uniformly spreading the product on a slice of bread with a knife.

The surprisingly high butterlikeness of the spread is also apparent when observing its melting behaviour and perceiving its taste and mouthfeel. When the spread is used for buttering hot toast or as a topping on cooked vegetables, its typical melting behaviour is quite similar to the melting behaviour of butter.

The merit of the invention is to provide a highly butterlike product, without the need to use any butter fat, employing a simple, cheap and quick process. Nevertheless, in order to enhance the butterlike perception, butter fat (and ingredients which contain butter fat, e.g. cream) may be incorporated in the initial water continuous emulsion, e.g. in an amount of 1–75 wt. %, preferably 1–50 wt. %, more preferably 1–25 wt. %, still more preferably 1–10 wt. % on fat phase.

One aspect of the invention is a spread obtained by the process according to the present invention is characterized in that the obtained spread shows butterlikeness with respect to spreadability, texture and mouthfeel, even when the fat phase contains less than 1 wt. % of butter fat.

Another embodiment of the invention consists of a large scale production line suitable for the manufacture of at least 1 ton per hour of an emulsion spread comprising equipment suited for the preparation of a cream with an average fat droplet size($D_{3,2}$) of 3–7 μm but preferably of 4–6 μm, a pasteurizer, a cooling unit and equipment for inversion of cream to fat continuity, characterised in that the inversion equipment is a cavity transfer mixer.

The invention is further exemplified by the following example:

GENERAL

Determination of Stevens Value

The "Stevens" hardness (St), expressed in grams, is determined not earlier than 1 week after manufacturing. The product is stored at 5° C. and thereafter equilibrated for 24 hours at a temperature of 5° C. or 20° C. as indicated. The Stevens value is measured using a 4.4 mm Ø cylindrical penetration probe and a Stevens-LFRA Texture Analyzer (ex Stevens Advanced Weighing Systems, Dunmore, U.K.) or SMS texture analyzer XT2 (ex Stable Microsystems, Surrey UK). The load range is 1000 g for LFRA and 25000 g for SMS TA-TX2 equipment. The Stevens LFRA Texture analyzer is operated in the "normal" mode and set at 10 mm penetration depth and 2 mm/s penetration rate.

EXAMPLE 1

Use of a Cavity Transfer Mixer

Starting with a fat blend consisting of

| | |
|---|---|
| 70 wt. parts | of an interesterified mixture consisting of |
| 40 wt. parts | coconut oil and |
| 60 wt. parts | palm oil, |
| 10 wt. parts | of coconut oil |
| 20 wt. parts | of soybean oil | a fat phase and a water phase were prepared with the following compositions:

| wt. parts | |
|---|---|
| 64.40 | fat blend |
| 0.40 | emulsifier |
| 0.20 | oily beta-carotene solution |
| 65.00 | fat phase |
| 32.00 | water |
| 2.50 | buttermilk powder |
| 0.20 | cooking salt |
| 0.30 | flavour |
| 35.00 | water phase |

Under continuous and vigorous stirring of the emulsion 65 wt. parts of the fat phase were pumped into a 4000 kg pre-mix tank which was loaded with 35 wt. parts of water phase. With an Ystral stirrer operating at 600–1000 rpm a concentrated O/W-cream of 55° C. was prepared. The cream was passed through a pasteurizer and kept at 75° C. for 45 seconds. The pasteurised cream was passed through two cooling units each consisting of a sequence of pipes, subsequently cooled by tap water and ice water. The first unit cooled the cream to about 40° C. and the second one to 13°–14° C. The cream was homogenised at 10 bar using an in-line pressure valve (ex APV Gaulin) when still having a temperature of 40° C. which reduces the risk of premature phase inversion.

The homogenised cream after the ice-water cooling step had a surface averaged fat droplet size ($D_{3,2}$) of 5.3 μm. FIG. 2 shows the distribution of the droplet sizes and Table I shows the accumulated volume percentages for subsequent size ranges. The cream was conducted into a cavity transfer mixer operating at a speed of 1300 rpm, where inversion took place. The aqueous droplets dispersed in the formed W/O-emulsion had an average ($D_{3,3}$) size of 2 μm and an e-sigma value being 2.2. The emulsion was allowed to crystallise and was finally packed at a common packaging line.

TABLE I

DISTRIBUTION OF FAT DROPLET SIZES

| Diameter (μm) up to | Volume % |
|---|---|
| 1.01 | 1.32 |
| 2.03 | 6.50 |
| 3.04 | 14.59 |
| 4.06 | 25.59 |
| 5.07 | 37.40 |
| 6.09 | 49.41 |
| 7.10 | 59.74 |
| 8.11 | 69.20 |
| 9.13 | 77.19 |
| 10.14 | 83.83 |
| 12.17 | 92.26 |
| 15.21 | 97.49 |
| 22.31 | 100.00 |

EXAMPLE 2

Use of a Scraped Surface Heat Exchanger

Starting with a fat blend consisting of

| | |
|---|---|
| 70 wt. parts | of an interesterified mixture consisting of |
| 40 wt. parts | coconut oil and |
| 60 wt. parts | palm oil, |
| 10 wt. parts | of coconut oil |
| 20 wt. parts | of soybean oil | a fat phase and a water phase were prepared with the following compositions:

| wt. parts | |
|---|---|
| 64.55 | fat blend |
| 0.30 | emulsifier blend |
| 0.0015 | oily beta-carotene (30%) solution |
| 0.15 | flavour |
| 65.00 | fat phase |
| 32.53 | water |
| 2.20 | buttermilk powder |
| 0.20 | cooking salt |
| 0.07 | citric acid (pH 4.9) |
| 35.00 | water phase |

Under continuous and vigorous stirring 65 wt. parts of the fat phase were pumped into a 3000 kg pre-mix tank which was loaded with 35 wt. parts of water phase. With an Ystral stirrer, operating at 600–1000 rpm, a concentrated O/W-cream of 55° C. was prepared. The cream was passed through a pasteurizer and kept at 80° C. for 45 seconds. The pasteurised cream was passed through two cooling units each consisting of a sequence of pipes, which units cooled the cream to about 40° C. The cream still having a temperature of 40° C. was homogenised at 10 bar using an in-line pressure valve (ex APV Gaulin).

The homogenised cream was conducted through a surface scraped heat exchanger (Votator A-unit). The supercooled cream having a temperature of 13° C. and characterised by a low viscosity and the absence of clustered fat, was conducted through a second A-unit operating at a speed of 400 rpm where the cream was fully inverted. The aqueous droplets dispersed in the formed W/O-emulsion had an average ($D_{3.3}$) size of 2.0 μm and an e-sigma value of 1.7. The emulsion was allowed to crystallise and was finally packed at a common packaging line.

The product obtained was compared with a product having the same composition but obtained with a cavity transfer mixer as inversion unit. Stevens values were measured (Table II) and a panel assessed appearance, melting behaviour and taste (Table III).

TABLE II

| Temperature (° C.) | Stevens value (g, cone 4.4 mm) | |
| --- | --- | --- |
| | CTM | SSHE |
| 5 | 619 | 557 |
| 10 | 395 | 319 |
| 15 | 161 | 137 |
| 20 | 45 | 37 |

TABLE III

PANEL ASSESSMENT

| Scale 1–10 | CTM | SSHE |
| --- | --- | --- |
| Appearance | 7.1 | 7.1 |
| Melting | 7.1 | 7.3 |
| Taste | 6.8 | 6.5 |

The Stevens values appear to be only slightly different. The overall conclusion of the panel assessment was that, within the normal fluctuations, the product achieved by means of SSHE-inversion had a quality which was comparable with the products obtained by CTM-inversion.

EXAMPLE 3

Use of a Fat Phase Containing Dairy Fat

A high fat cream was prepared of which the fat phase and the water phase had the following compositions:

| wt. parts | |
| --- | --- |
| 36 | of a fat blend consisting of |
| 70 | wt. % of an interesterified mixture consisting of |
| 40 | wt. % of coconut oil and |
| 60 | wt. % of palm oil, |
| 10 | wt. % of coconut oil |
| 20 | wt. % of soybean oil |
| 24 | of dairy fat |
| 4 | of sunflower oil |
| 0.15 | emulsifier (HYMONO 8803) |
| 0.18 | emulsifier (BOLEC MT) |
| 0.0019 | oily beta-carotene solution (30%) |
| 0.015 | flavour |
| 64.34 | fat phase |
| 35.19 | water phase from cream |
| 0.12 | bacterial culture for cream souring |

-continued

| wt. parts | |
| --- | --- |
| 0.35 | cooking salt |
| 35.66 | water phase |

A 40% fat dairy cream (1200 kg) was soured to a pH of 5.2 with a bacterial culture. The cream was sucked into a jacketted tank and was warmed up from 5° to 30° C. At 30° C. souring was started by adding a bacterial culture. For lowering the pH from 6.6 to 5.2 7.5 hours were needed. During souring slow stirring was applied to avoid flocculation of the fat. The cream (pH 5.2) was conducted through a Pasteur ((75° C., 45 sec) to stop the bacteriological souring, cooled to 55° C. (tubular heat exchanger) and feeded into into a pre-mix tank, where the vegetable fat blend and other ingredients were added, up to 64 wt. % of fat(on cream). The total pre-mix was vigorously stirred with an Ystral stirrer operating at 600–1000 rpm until oil droplet size of the total premix ($D_{3.2}$) was about 3 μm. After completing the emulsification the total premix was pasteurized (75° C., 45 sec), conducted through the first cooling units consisting of a sequence of pipes, and was cooled to 40° C. The cream having a temperature of 40° C. was homogenised at 10 bar using an in-line pressure valve (ex APV Gaulin).

The declustered cream (40° C.) was conducted through the second cooling unit consisting of a sequence of pipes, consecutively cooled by tap water and ice water until a temperature of 8–9° C.

Then the cream was conducted through a cavity transfer mixer operating at a speed of 850 rpm, where inversion took place. The aqueous droplets dispersed in the formed W/O-emulsion (T=19.2° C.) had an average ($D_{3.3}$) size of 1.7 μm and an e-sigma value of 2.5. The emulsion was allowed to crystallise and was finally packed at a common packaging line.

Table IV shows the Stevens values.

TABLE IV

| Temperature ° C. | Stevens value g, cone 4.4 mm |
| --- | --- |
| 5 | 874 |
| 10 | 494 |
| 15 | 96 |
| 20 | 53 |

EXAMPLE 4

Use of a Fat Phase Containing Dairy Fat

A spread was prepared containing dairy fat and a water phase which was soured with citric acid. The fat phase and the water phase had the following compositions:

| wt. parts | |
| --- | --- |
| 34 | of a fat blend consisting of |
| 70 | wt. % of an interesterified mixture consisting of |
| 40 | wt. % of coconut oil and |
| 60 | wt. % of palm oil, |

-continued

| wt. parts | |
|---|---|
| 10 | wt. % of coconut oil |
| 20 | wt. % of soybean oil |
| 24 | dairy fat |
| 6 | sunflower oil |
| 0.15 | emulsifier (HYMONO 8803) |
| 0.18 | emulsifier (BOLEC MT) |
| 0.0019 | oily beta-carotene solution (30%) |
| 0.015 | flavour |
| 64.34 | fat phase |
| 35.24 | water phase from cream |
| 0.35 | cooking salt |
| 0.07 | citric acid (pH 5.2) |
| 35.66 | water phase |

A 40% fat dairy cream (1200 kg) was soured to a pH of 5.2 using citric acid. The cream was sucked into a jacketted tank and was warmed up from 5° to 55° C. A diluted citric acid solution (20%) was added to lower the pH from 6.6 to 5.2. The cream (pH 5.2) was pumped into a pre-mix tank, where vegetable fat blend and other ingredients were added, up to 64 wt. % of fat(on cream) and vigorously stirred with an Ystral stirrer operating at 600–1000 rpm until oil droplet size ($D_{3.2}$) was about 3 μm. After completing the emulsification the total premix was pasteurized (75° C., 45 sec), conducted through the first cooling unit consisting of a sequence of pipes, and was cooled to 40° C. The cream having a temperature of 40° C. was homogenised at 10 bar using an in-line pressure valve (ex APV Gaulin).

The declustered cream (40° C.) was conducted through the second cooling unit consisting of a sequence of pipes, consecutively cooled by tap water and ice water until a temperature of 6° C.

Then the cream was conducted into a cavity transfer mixer operating at a speed of 1050 rpm, where inversion took place. The aqueous droplets dispersed in the formed W/O-emulsion (T=16.7° C.) had an average ($D_{3.3}$) size of 1.4 μm and an e-sigma value being 2.4. The emulsion was allowed to crystallise and was finally packed at a common packaging line. Table V shows the Stevens values.

TABLE V

| Temperature ° C. | Stevens value g, cone 4.4 mm |
|---|---|
| 5 | 900 |
| 10 | 489 |
| 15 | 92 |
| 20 | 56 |

EXAMPLE 5

Product Assessment

Three spreads, spread A, spread B and spread C, prepared with a process according to the present invention, were subjected to assessment by a panel (n=200) of which 50% of the participants were regular consumers of butter and 50% regular consumers of margarine. Of the main spread attributes, as are Spreadability, Texture, Mouthfeel, Taste and Colour, the panel members have judged the first three attributes in comparison with a high quality margarine (RAMA) and butter. Moreover, the combined attribute Mouthfeel/Spreadability was assessed. Test conditions comprise: products, having a temperature of 5° C., were tasted after been spread on toast.

Table VI shows the assigned ratings.

TABLE VI

| Property (scale) | RAMA | Spread A | Spread B | Spread C | Butter |
|---|---|---|---|---|---|
| Spreadability (1–7) | 5.4 | 3.9 | 4.0 | 3.9 | 2.3 |
| Mouthfeel (1–5) | 3.4 | 3.6 | 3.4 | 3.6 | 3.3 |
| Texture (soft/firm balance) (1–5) | 2.6 | 3.6 | 3.7 | 3.7 | 4.4 |
| Spreadability + Mouthfeel (1–10) | 4.4 | 4.4 | 5.0 | 4.6 | 6.3 |

It appears that, with the exception of Mouthfeel, the properties of the products of the invention have a score which is intermediate between the high quality margarine RAMA and butter. Although the properties of butter have not yet been equalled, substantial progress has been made in that direction.

What is claimed is:

1. Process for the preparation of a spread comprising an edible W/O emulsion which contains 50–85 wt. % of triglyceride fat, comprising the steps of
   a. preparing a cream, 15–50 wt. % of which comprises an aqueous phase in which 50–85 wt. % of liquefied fat is dispersed as fine droplets,
   b. pasteurizing the cream,
   c. cooling the cream and then conducting it through an inversion unit where inversion to a fat continuous emulsion takes place,
   d. allowing the inverted fat-continuous emulsion to crystallize to a spread, characterized, in that
   a cream is used having a surface averaged fat droplet size ($D_{3.2}$) of 3–7 μm,
   the cream is cooled to a temperature where the dispersed fat is liquid and in a supercooled condition,
   the cream is inverted completely within 30 seconds after it has entered the inversion unit.

2. Process according to claim 1, characterized in that the fat of the inverted fat continuous emulsion is allowed to crystallize under quiescent conditions.

3. Process according to claim 2, characterized in that at least 70 wt. % of the fat of the spread crystallizes under quiescent conditions.

4. Process according to claim 1, characterized in that the fat phase of the cream when entering the inversion unit contains less than 6 wt. % of crystallized fat on total fat phase.

5. Process according to claim 1, characterized in that the inversion unit is a cavity transfer mixer.

6. Process according to claim 1, characterized in that the cream consists of 30–45 wt. % of an aqueous phase and 55–70 wt. % of a fat phase.

7. Process according to claim 1, characterized in that the cream contains 0.02–10 wt. % of dairy protein on aqueous phase.

8. Process according to claim 1, characterized in that a fat phase is used which contains 1–75 wt. % (on fat phase) of dairy fat.

9. Spread obtained by the process according to claim 1, characterized in that the obtained spread shows butterlikeness with respect to spreadability and mouthfeel, while the fat phase contains less than 1 wt. % of butter fat.

10. Spread obtained by the process according to claim 1, characterized in that the spread has a Stevens-value of $\geq 300$ g when measured at 10° C. and with a cone of 4.4 mm.

11. Spread obtained by the process according to claim 1, characterized by a hardness as expressed in Stevens-values which decreases when the spread is exposed to cycling conditions.

12. Process according to claim 1, characterized in that the surface averaged fat droplet size ($D_{3.2}$) is from 4 to 6 μm.

13. Process according to claim 1, wherein cooling of the cream is such that neither substantial crystallization of a supercooled fat nor inversion has occurred when the cooled cream enters the inversion unit.

* * * * *